United States Patent
Brunet

(10) Patent No.: US 7,161,871 B2
(45) Date of Patent: Jan. 9, 2007

(54) METHOD FOR DETERMINING OCEAN CURRENT AND ASSOCIATED DEVICE

(75) Inventor: Philippe Brunet, Bures sur Yvette (FR)

(73) Assignee: CGG Marine, Massy (FR)

( * ) Notice: Subject to any disclaimer, the term of this patent is extended or adjusted under 35 U.S.C. 154(b) by 70 days.

(21) Appl. No.: 10/468,172

(22) PCT Filed: Feb. 15, 2002

(86) PCT No.: PCT/FR02/00587

§ 371 (c)(1),
(2), (4) Date: Dec. 22, 2003

(87) PCT Pub. No.: WO02/065156

PCT Pub. Date: Aug. 22, 2002

(65) Prior Publication Data

US 2004/0100867 A1  May 27, 2004

(30) Foreign Application Priority Data

Feb. 15, 2001 (FR) .................................. 01 02061

(51) Int. Cl.
  *G01V 1/38* (2006.01)
(52) U.S. Cl. ....................................................... 367/89
(58) Field of Classification Search .................. 367/89
  See application file for complete search history.

(56) References Cited

U.S. PATENT DOCUMENTS 4,068,208 A  1/1978  Rice
5,921,713 A * 7/1999  Gjessing et al. ............ 405/170
6,111,817 A * 8/2000  Teeter ......................... 367/13
2004/0114466 A1* 6/2004  Alliot ........................... 367/99

FOREIGN PATENT DOCUMENTS

| EP | 1031855 A | 8/2000 |
| WO | WO 00 20895 A | 4/2000 |
| WO | WO002065156 A1 * | 8/2002 |

* cited by examiner

*Primary Examiner*—Dan Pihulic
(74) *Attorney, Agent, or Firm*—Blakely Sokoloff Taylor & Zafman

(57) ABSTRACT

The invention relates to a method for determining ocean current using geophysical data acquisition means which are on board a ship, said ship towing at least one streamer which is equipped with at least one traction sensor and position measuring means. The invention is characterized in that it comprises the following steps, consisting in: collecting the measurements from said traction sensor, collecting the measurements from said position measuring means, repeatedly calculating a current vector that is representative of the real current by repeating the following operations using a given sampling time step: calculating simulated traction and streamer positioning data for numerous simulation input current vectors, comparing the simulated data to real measurements taken by said traction and position measuring means for each simulation input current vector. The invention also relates to a device used to carry out one such method.

16 Claims, 4 Drawing Sheets

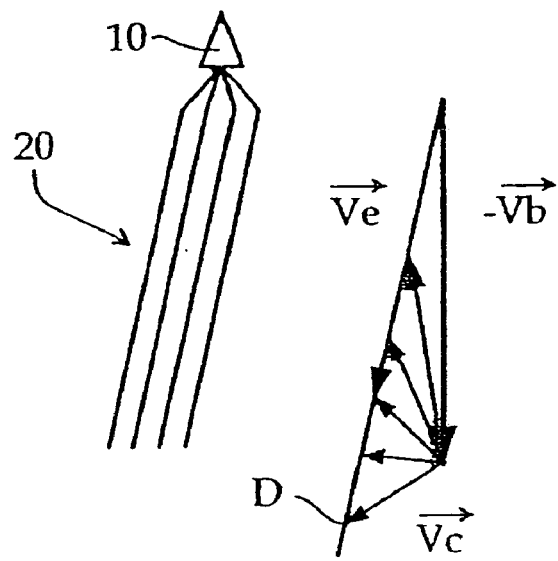
FIG_1a
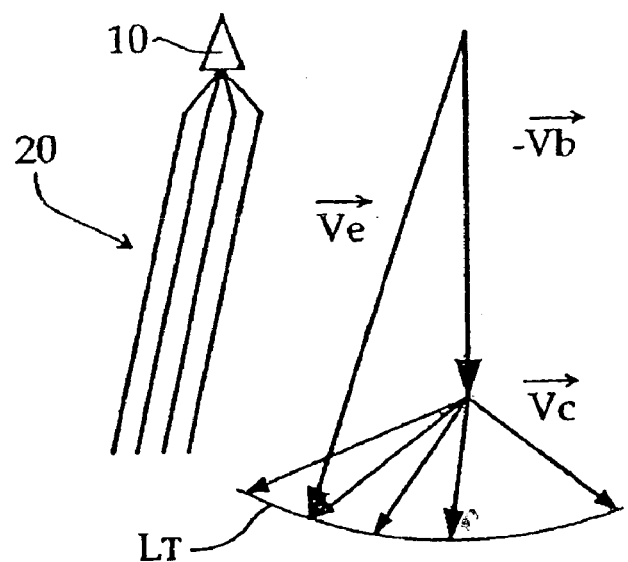
FIG_1b

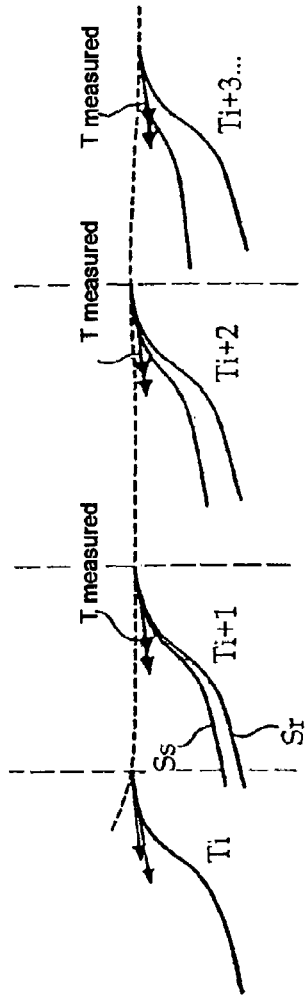
FIG_2
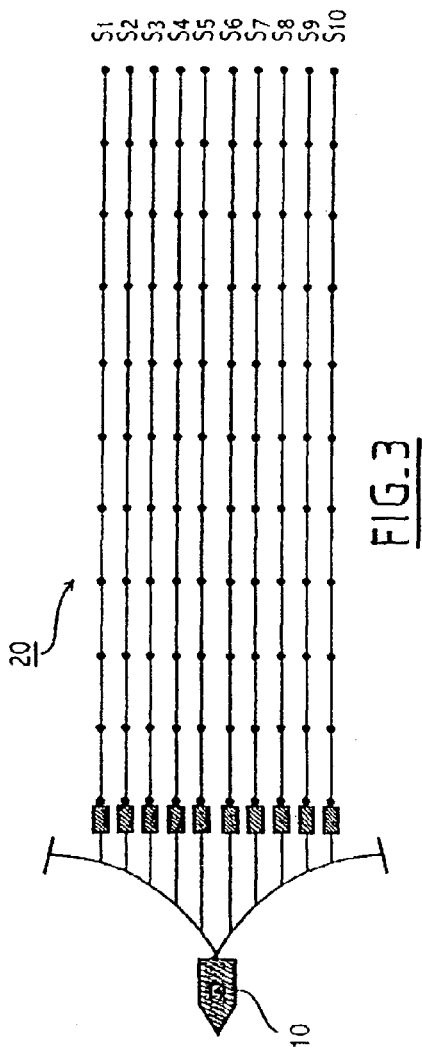
FIG_3

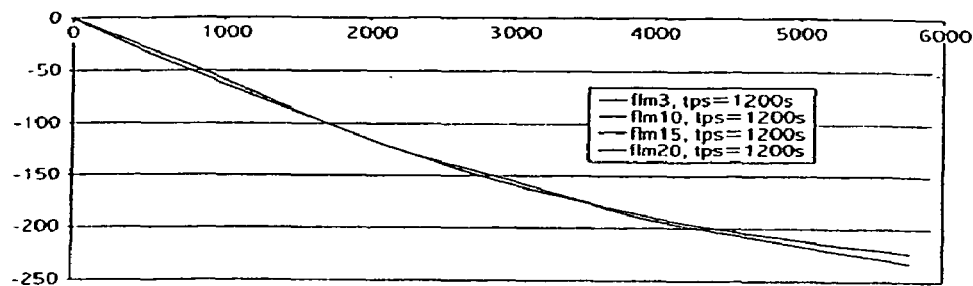
FIG_4a
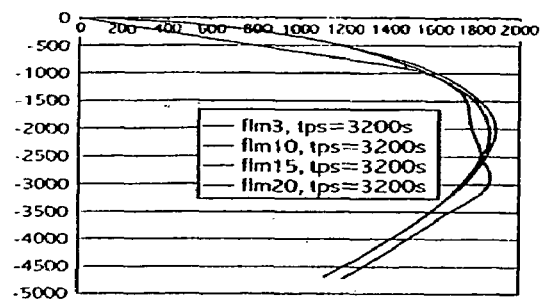
FIG_4b
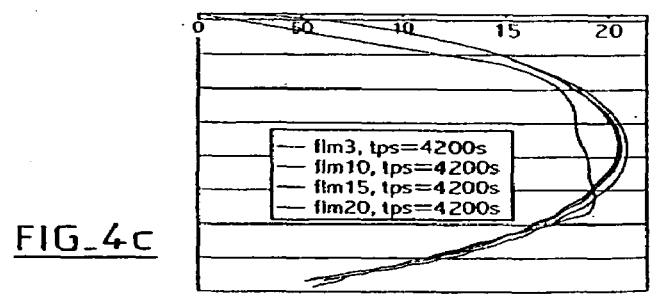
FIG_4c

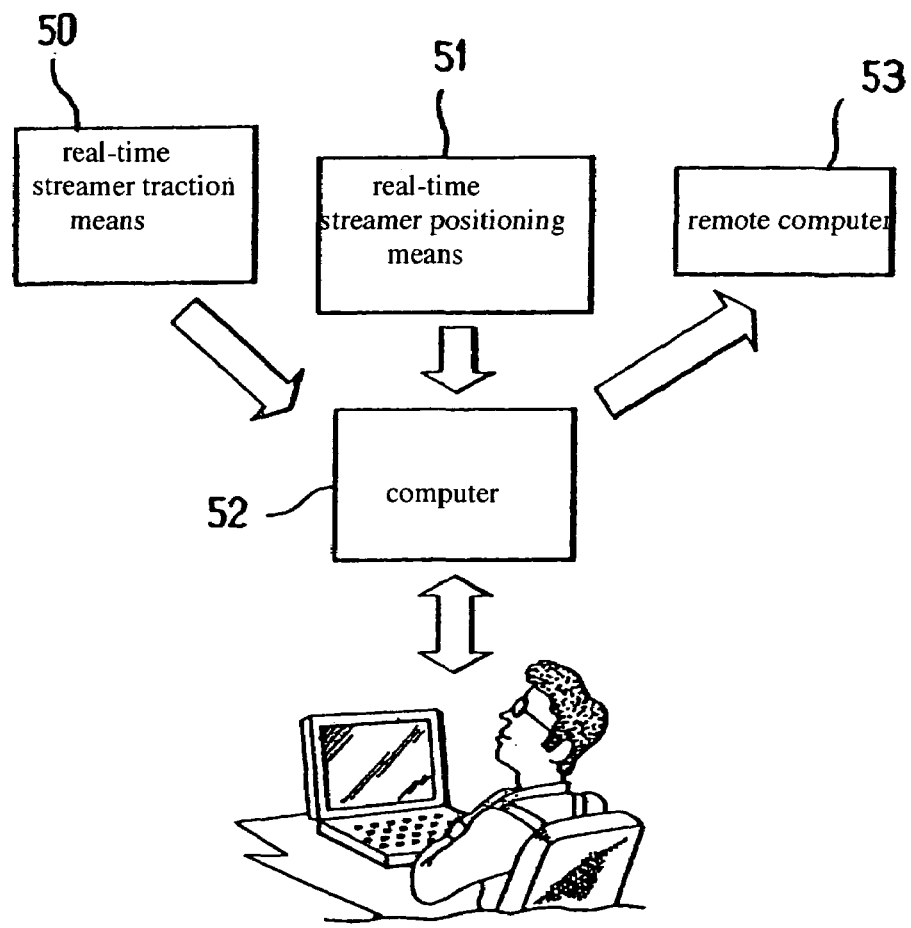
FIG_5

METHOD FOR DETERMINING OCEAN CURRENT AND ASSOCIATED DEVICE

BACKGROUND OF THE INVENTION

The present invention relates in a general manner to geophysical data acquisition operations at sea using underwater seismic measurements.

1. Field of the Invention

More precisely, the invention relates to an original procedure for determining the ocean current, through means on board a data acquisition ship. The invention also relates to a device for the implementation of such a method.

2. Description of the Related Art

In order to successfully conduct geophysical data acquisition operations at sea, it is necessary to have access to measurements of ocean current. These measurements make it possible to take into account the effect of the current on the ship, and on the towed devices (in particular, hydrophones integrated into cables called "streamers" to use the widespread terminology).

To measure the current, it is known for acquisition means such as current meter buoys to be deployed in situ.

However, such a solution is hardly satisfactory insofar as it is particularly cumbersome and expensive to implement.

It is also possible to measure the relative longitudinal current with respect to the boat relatively simply by virtue of an on-board log. However, such a log provides only a unidirectional measurement, relative to the ship.

Another on-board solution for measuring current consists in utilizing the measurements of a hull profiler of the Acoustic Doppler Current Profiler (ADCP) type to use the widespread terminology.

Such a profiler comprises means for transmitting acoustic beams into the water in several directions, the transmission means being fixed under the hull of the ship, and means for receiving and analyzing the signals reflected by the water particles.

As a function of the frequency variations observed for the various signals received, it is possible to determine the current at various depths.

The hull profiler thus makes it possible to determine a flow current with respect to the ship, from which the ship's forward vector is subsequently deducted in order to obtain the absolute current.

However, several drawbacks are associated with a hull profiler as envisaged hereinabove.

A first drawback is that it is necessary to carry out very fine adjustment (of the order of $\frac{1}{10}$th of a degree) of the orientation of the device with respect to the ship, in order to avoid biases in the measured current vectors.

A second drawback of hull profilers is that these devices generate measurement errors when the ship is turning.

A third drawback of profilers is related to the "ringing" phenomenon. This phenomenon corresponds to a reverberation of the waves emitted on hull elements of the ship, the ADCP often being mounted in a hull-related structure, such as a well in the hull of the ship.

Such reverberation produces reflected waves which are received by the device as waves representative of a zero relative current (since it has the same frequency as the waves emitted). This disturbance may have an appreciable effect on the measurements performed at small depths.

Also, this drawback may be particularly penalizing in the context of seismic measurements at sea, insofar as for ships with large draft, "small depths" with respect to the device fixed under the hull correspond substantially to the depth of submersion of the streamers, so that the measurement of current at these depths is not reliable.

BRIEF SUMMARY OF THE INVENTION

The aim of the invention is to make it possible to produce measurements of current whilst circumventing the drawbacks cited above.

In order to achieve this aim the invention proposes according to a first aspect a method of determining ocean current implementing geophysical data acquisition means on board a ship, said ship towing at least one streamer furnished with traction measurement means and with positioning measurement means, characterized in that the method comprises the steps consisting in:

collecting the measurements from said traction measurement means, collecting the measurements from said positioning measurement means, repeatedly calculating a current vector representative of the real current by repeating the following operations according to a given sampling time interval:

calculating simulated streamer positioning and traction data for a plurality of simulation input current vectors, determining said current vector representative of the real current by comparing the measured and simulated values for the various simulation input current vectors.

Preferred but nonlimiting aspects of the method according to the invention are the following:

the determination of said current vector representative of the real current implements the following operations for each sampling time interval:

defining deviations of traction and of positioning between the data simulated with real measurements performed by said measurement means, for each simulation input current vector, determining said current vector representative of the real current by analyzing said deviations of traction and of positioning, the step of calculating the current vector representative of the real current comprises the determination for each simulation input current vector of a relative deviation of traction, and of a relative deviation of positioning, the determination of the current vector results from the minimizing of a function of the coordinates of the current vector, to calculate the current vector representative of the real current, a function of the following general form is minimized:

$$f(\theta, v) = \frac{1}{T}\int_T \beta \cdot i \text{ (relative deviation of positioning)} +$$
$$(1 - \beta) \cdot \text{(relative deviation of traction)},$$

β being a weighting coefficient, the function to be minimized is a convex function, the minimization of said function is performed by a gradient procedure, the function to be minimized is of the form:

$$F(Vx, Vy) = \frac{K1}{L \cdot (T1 - T0)} \times \int_{T0}^{T1}\int_0^L |Fmes(s, t) - Fsim(Vx, Vy, s, t)|\, ds\, dt +$$

-continued $$\frac{K2}{L \cdot (T1-T0)} \times \int_{T0}^{T1} \int_{0}^{L} \sqrt{\frac{(Xmes(s,t) - Xsim(Vx, Vy, s, t))^2 +}{(Ymes(s,t) - Ysim(Vx, Vy, s, t))^2}} \, ds \, dt$$

with the following notation:

Vx, Vy=components of the current to be determined,

Xmes(s,t), Ymes(s,t)=coordinates of the point with curvilinear abscissa s of the streamer measured at the instant t, Xsim(Vx,Vy,s,t), Ysim(Vx,Vy,s,t)=coordinates of the point with curvilinear abscissa s of the streamer simulated at the instant t, Fmes(s,t)=traction force measured at the curvilinear abscissa s and at the instant t, Fsim(Vx,Vy,s,t)=traction force at the curvilinear abscissa s and at the instant t, T0, T1=respective instants of start and end of simulation, L=length of streamer, K1, K2=weighting coefficients during the first calculation of simulated streamer traction and positioning data, the input current vector is the current vector which, for the previous time span, has provided the simulation of streamer traction and deformation curve closest to the measured traction and measured deformation curve, said sampling time interval is chosen in such a way as to be long enough to cover several acquisitions of positioning and traction measurements by said measurement means.

the duration of said sampling time interval is of the order of a few minutes.

for each streamer furnished with traction measurement means, a traction measurement is performed at the head of the streamer.

the simulated streamer positioning and traction data are obtained via an unsteady hydrodynamic coupling algorithm.

said algorithm models each streamer by several pieces when the ship is moving along a substantially rectilinear trajectory, and by a greater number of segments when the ship is turning.

said greater number of segments is of the order of fifteen.

According to a second aspect, the invention also proposes a device for the implementation of the method as claimed in one of the preceding claims, characterized in that it comprises the streamer traction acquisition means, streamer positioning acquisition means, and processing means allowing the implementation of an algorithm to determine at each sampling time interval a current vector representative of the real current.

BRIEF DESCRIPTION OF THE DRAWINGS

Other aspects, aims and advantages of the invention will become better apparent on reading the following description, with regard to which:

FIGS. 1a and 1b are two diagrammatic representations of a ship towing a set of streamers, FIG. 2 illustrates the principle of implementation of the invention, which utilizes the deviations between measured and simulated values of streamer traction and positioning, FIG. 3 is a diagrammatic representation of a ship towing a set of streamers, that are more detailed than the representation of FIGS. 1a and 1b, FIGS. 4a to 4c are graphs illustrating the influence of the modeling of the streamers in the implementation of the invention, FIG. 5 is a diagrammatic representation of a device for implementing the invention.

DETAILED DESCRIPTION OF THE INVENTION

FIGS. 1a and 1b very diagrammatically represent a ship 10 towing a set 20 of streamers.

In the example shown diagrammatically in FIGS. 1a and 1b, the set 20 comprises four streamers; however, this representation is in no way limiting, the invention being implementable with a towed device comprising any number of streamers.

Represented in FIGS. 1a and 1b alongside the ship and the set of towed streamers are:

the vector $-\vec{Vb}$, which is the opposite of the boat's forward vector with respect to the bottom, this forward vector being determinable by measurements of GPS type for example, as well as a plurality of vectors $\vec{Vc}$, each vector $\vec{Vc}$ being a possible current vector representative of a value of the ocean current with respect to the bottom, finally, a vector $\vec{Ve}$, representing the flow of the water with respect to the ship and to the streamers is also represented; this vector corresponds to the sum of the vectors $\vec{Vb}$ and of one of the current vectors $\vec{Vc}$.

It is understood that, starting from the simple case of a rectilinear streamer, there exists an infinity of flow vectors (that is to say vectors $\vec{Ve}$), mutually parallel, conferring a given orientation on the streamer, that is to say a given positioning of each point of the streamer.

This is illustrated in FIG. 1a wherein is represented a plurality of current vectors $\vec{Vc}$ each of which, when added with the vector $-\vec{Vb}$ to give a vector $\vec{Ve}$ of water flow with respect to the ship and to the streamers, culminates in a flow vector $\vec{Ve}$ along the same given direction D.

Similarly, FIG. 1b shows that there also exists an infinity of different current vectors $\vec{Vc}$ which, when added with a given vector $-\vec{Vb}$, culminate in flow vectors $\vec{Ve}$ having the same modulus. These vectors $\vec{Ve}$ of like modulus thus describe the line LT represented in FIG. 1b.

Also, vectors $\vec{Ve}$ having the same modulus correspond to one and the same traction applied by the current to the streamer.

It is moreover understood that, starting from a given orientation and a given traction associated with a streamer (or streamer element as will be detailed hereinbelow), there exists a unique current vector $\vec{Vc}$ whose effect on the streamer/streamer element is conveyed by the given orientation and given traction.

In the case of a seismic measurements acquisition ship towing at least one streamer for which measurements of streamer positioning and measurements of streamer traction are available, the invention proposes that the principles set forth hereinabove be utilized to determine in a recurrent manner a current vector representative of the real current.

More precisely, as will be explained, the invention makes it possible to determine such a vector by simulating in a recurrent manner according to a sampling time interval, which is the main time interval of implementation of the invention, for various values of input current, the positioning and the traction of one or more streamer(s), then by determining for each sampling time interval that one of the input currents which makes it possible to best approximate the real measurements of positioning and of traction performed for the streamer(s) considered.

These steps may thereafter be repeated according to the sampling time interval said sampling time interval having to be:

big enough to cover several acquisitions of real measurements of positioning and of traction, and brief enough in order for the hypothesis of a steady current within each of these sampling time intervals to be compatible with the real current metering. Indeed, the streamer traction and positioning simulation performed on the basis of the input current vectors assumes a hypothesis of steady current within a sampling time interval.

To initiate the operation of the steps mentioned hereinabove, and allow the iteration of the calculation of a current vector allowing best possible reconstruction by simulation of the positioning and the traction of the streamers, it is moreover necessary to provide an initial input current vector as simulation input. This aspect will be returned to.

In order to determine the input current vector that allows best approximation, by way of a simulation, of the real measurements of positioning, one calculates for each sampling time interval the possible values of the relative deviation between:

the measured traction for a streamer towed in a marine environment traversed by a real current, and the simulated traction, doing so for various values of the simulation input current vector (which in the present case is determined in a two-dimensional manner by its modulus v and its orientation θ in the plane—however, it would also be possible to implement the invention in respect of the calculation of a three-dimensional current).

The traction measured by a traction sensor positioned on a streamer (preferably at the head of the streamer) is denoted Tmeasured(t), and the simulated traction at the same point of the streamer is denoted Tsimulated(t).

Also, the possible values of relative deviation of positioning are likewise calculated by analyzing the deviations between simulated positioning of one or more determined points of the streamer, and positioning measured by the positioning measurement device at corresponding points of the real streamer.

The function to be minimized for each sampling time interval is therefore of the general form:

$$f(\theta, v) = \frac{1}{T}\int_T \beta \cdot i \text{ (relative deviation of positioning)} + (1-\beta) \cdot \text{(relative deviation of traction)},$$

T corresponding to the duration of the sampling time interval.

β is a weighting coefficient whose value can be tailored in such a way as to favor the charting of the deviations of traction, or of positioning.

In a representation of current V by coordinates (Vx, Vy), the function to be minimized to obtain a measurement of current over the period of current T0, T1) is a discretized form of:

$$F(Vx, Vy) = \frac{K1}{L.(T1-T0)} \times \int_{T0}^{T1}\int_0^L |Fmes(s,t) - Fsim(Vx, Vy, s, t)|\,ds\,dt +$$

$$\frac{K2}{L.(T1-T0)} \times \int_{T0}^{T1}\int_0^L \sqrt{\begin{array}{l}(Xmes(s,t) - Xsim(Vx, Vy, s, t))^2 + \\ (Ymes(s,t) - Ysim(Vx, Vy, s, t))^2\end{array}}\,ds\,dt$$

where K1 and K2 are weighting coefficients, which define the relative magnitude of the positioning deviations and traction deviations. For example, if K1 and K2 are given the respective values 1/500 and 1/10, this amounts to saying that a traction deviation of 500 N is as penalizing as a positioning deviation of 10 m.

In the expression for the function F(Vx,Vy) to be minimized set forth hereinabove, the following notation is adopted:

Xmes(s,t), Ymes(s,t)=coordinates of the point with curvilinear abscissa s of the streamer measured at the instant t, Xsim(Vx,Vy,s,t), Ysim(Vx,Vy,s,t)=coordinates of the point with curvilinear abscissa s of the streamer simulated at the instant t, the simulation taking into account a current having components Vx,Vy, Fmes(s,t)=traction force measured at the curvilinear abscissa s and at the instant t, Fsim(Vx,Vy,s,t)=traction force at the curvilinear abscissa s and at the instant t for the streamer simulated with a current having components Vx,Vy, T0,T1=respective instants of start and end of period of current (sampling time interval), L=length of streamer.

Such a function F being regular and convex, as has been demonstrated by calculations performed by the applicant, said function F may be minimized in a simple manner. A gradient procedure is particularly well suited for this purpose.

It is pointed out that in order to obtain a simulation of traction on the streamer on the basis of an input current vector, a model of unsteady hydrodynamic coupling between the ocean current and streamer is implemented.

It is also pointed out that it is possible to implement such a coupling model by modelling the streamer in the form of a single rectilinear element, or else in the form of several rigid pieces articulated together by perfect pivot links, the traction then being calculated for each piece and being determinable by interpolation at every point of the streamer.

In any event, the hydrodynamic coupling model itself may be a model known per se.

It is pointed out finally that in order to best represent the streamers actually towed, the model can also take into account a head buoy connected to the rear of each streamer.

To obtain the positioning of the streamer use is made of the same unsteady hydrodynamic coupling model as mentioned hereinabove in respect of the traction simulations.

Here again also, the streamer can be modelled in the form of a single rectilinear element, or else in the form of a set of pieces articulated together.

In the latter case, it is possible to calculate the positioning of each piece (or of certain of them), a positioning measurement then having to be associated with corresponding sections of the real streamer.

FIG. 2 illustrates the principle of implementation of the invention, which within a given time span, consisting of several successive measurement instants Ti, Ti+1, Ti+2, Ti+3, . . . utilizes the deviations between values associated with a "real" streamer Sr on which measurements are performed at one or more determined point(s), and values associated with a "simulated" streamer Ss.

Within each simulation time interval, the function F is minimized for each streamer that has been modelled and for which real measurements are available.

Concerning the real measurements of traction and positioning, FIG. 3 is a diagrammatic representation of a ship 10 towing a set 20 of streamers (said set comprising 10 streamers S1 to S10 in this more detailed representation).

In this figure, each streamer is associated with a traction sensor placed at the head of the streamer and represented in the form of a rectangle, as well as with a plurality of positioning measurement points represented in the form of points distributed along the streamer. In this figure each streamer is associated with eleven positioning measurement points, thereby making it possible to model the streamer by ten articulated pieces.

These positioning measurements may implement known means, such as high-frequency underwater acoustic transmitters/receivers, possibly associated with a compass, the transmitters/receivers communicating with a DGPS system on board the ship and with RGPS devices associated with buoys attached at various points of the towed device.

For reasons of economy of calculation time, the streamers may be modeled by a single rigid rectilinear element in the case of a ship moving in a straight line.

However, results of higher accuracy will be obtained by modeling each streamer by a succession of articulated pieces. For a straight line, the applicant has determined that it was satisfactory to model the streamers in the form of three pieces.

When the ship turns, it will be beneficial to increase the number of elements modeling a streamer. In this case, it will be necessary to tailor the number of sensors associated with the real streamer.

FIG. 3 thus represents eleven positioning measurement points distributed along each streamer, a traction sensor being moreover placed at the head of each streamer.

In the case where the streamers are modeled by a succession of inter-articulated rigid elements, it is also possible to differently weight the measurements performed at the various sections of each streamer. More significance can be given for example to the deviations at the streamer tail, the latter possibly being more sensitive to the variations in current.

As far as the duration of the sampling time interval is concerned, the applicant has determined that the hypothesis of quasi-steady current within a sampling interval was satisfied as long as the latter had a value not exceeding a few minutes. By way of indication, satisfactory trials were carried out with sampling time intervals of five minutes and of ten minutes. A duration of the order of a few minutes is thus appropriate.

As far as the number of pieces modeling each streamer is concerned, the modeling of a streamer 5800 meters long, for which a turn within the turning radius is 2500 meters, may be performed with about fifteen pieces.

FIGS. 4*a* to 4*c* illustrate the influence of the number of elements modeling a streamer on the results for the deformation curve. In FIG. 4*a*, the positioning of the streamer at equilibrium is represented before the turn, for four types of modeling of the streamer:

curve Flm3: three pieces
curve Flm10: ten pieces
curve Flm15: fifteen pieces
curve Flm20: twenty pieces It is observed that the deviations are not as considerable.

FIGS. 4*b* and 4*c* show on the other hand that it is necessary to model the streamer by a considerable number of pieces to obtain a regular shape, representative of the geometry of the real streamer when turning (FIG. 4*b* corresponds to a modeling of the streamer during the turn, and FIG. 4*c* on exiting the turn).

It was stated that for the first iteration of the calculation of the current it was necessary to provide an initial current vector as simulation input.

To implement the invention, one makes the hypothesis that the current is constant within a sampling time interval, this initial current vector is determined in the following manner:

during the first time span for which one wishes to determine the current, the algorithm can be provided with an arbitrarily zero current as first current vector. The function to be minimized being convex, the gradient procedure converges to the solution vector.

in order to optimize the calculation time, for subsequent time spans, the algorithm is initialized with the current vector determined during the previous time span.

FIG. 5 diagrammatically illustrates a device for implementing the invention, which comprises means 50 for measuring streamer traction, means 51 for measuring real-time streamer positioning, the measurements from the means 50 and 51 being routed to a computer 52 on board the acquisition ship comprising the algorithm described hereinabove and making it possible to determine a simulated current representative of the real current.

It is also possible to make the computer 52 communicate with a remote computer 53, said remote computer possibly being on board or otherwise. The links between the various elements of this device may be of any type known per se, using wire or otherwise.

The invention claimed is:

1. A method of determining ocean current implementing geophysical data acquisition means on board a ship, said ship towing at least one streamer furnished with traction measurement means and with positioning measurement means, the method comprising the steps of:
    collecting the measurements from said traction measurement means,
    collecting the measurements from said positioning measurement means,
    repeatedly calculating a current vector representative of the real current by repeating the following operations according to a given sampling time interval:
        calculating simulated streamer positioning and traction data for a plurality of simulation input current vectors,
        determining said current vector representative of the real current by comparing the measured and simulated values for the various simulation input current vectors.

2. The method as claimed in claim 1, characterized in that the determination of said current vector representative of the real current implements the following operations for each sampling time interval:
    defining deviations of traction and of positioning between the data simulated with real measurements performed by said measurement means, for each simulation input current vector, determining said current vector representative of the real current by analyzing said deviations of traction and of positioning.

3. The method as claimed in claim 1 or claim 2, characterized in that the step of calculating the current vector representative of the real current comprises the determination for each simulation input current vector of a relative deviation of traction, and of a relative deviation of positioning.

4. The method as claimed in claim 1, characterized in that the determination of the current vector results from the minimizing of a function of the coordinates of the current vector.

5. The method as claimed in claim 4, characterized in that to calculate the current vector representative of the real current, a function of the following general form is minimized:

$$f(\theta, v) = \frac{1}{T}\int_T \beta \cdot i \text{ (relative deviation of positioning)} + (1 - \beta) \cdot \text{(relative deviation of traction)},$$

$\beta$ being a weighting coefficient.

6. The method as claimed in claim 5, characterized in that the function to be minimized is a convex function.

7. The method as claimed in claim 6, characterized in that the minimization of said function is performed by a gradient procedure.

8. The method as claimed in claim 4, claim 5, claim 6, or claim 7, characterized in that the function to be minimized is of the form:

$$F(Vx, Vy) = \frac{K1}{L \cdot (T1-T0)} \times \int_{T0}^{T1}\int_0^L |Fmes(s,t) - Fsim(Vx, Vy, s, t)|\,ds\,dt + \frac{K2}{L \cdot (T1-T0)} \times \int_{T0}^{T1}\int_0^L \sqrt{\begin{array}{c}(Xmes(s,t) - Xsim(Vx,Vy,s,t))^2 + \\ (Ymes(s,t) - Ysim(Vx,Vy,s,t))^2\end{array}}\,ds\,dt$$

with the following notation:
Vx, Vy=components of the current to be determined,
Xmes (s,t), Ymes (s,t)=coordinates of the point with curvilinear abscissa s of the streamer simulated at the instant t,
Xsim(Vx,Vy,s,t), Ysim(Vx,Vy,s,t)=coordinates of the point with curvilinear abscissa s of the streamer simulated at the instant t,
Fmes (s,t)=traction force at the curvilinear abscissa s and at the instant t,
Fsim (Vx,Vy,s,t)=traction force measured at the curvilinear abscissa s and at the instant t,
T0, T1=respective instants of start and end of simulation,
L=length of streamer,
K1, K2=weighting coefficients.

9. The method as claimed in claim 1, characterized in that during the first calculation of simulated streamer traction and positioning data, the input current vector is the current vector which, for a time span given the previous time span, has provided the simulation of streamer traction and deformation curve closest to the measured traction and measured deformation curve during a previous simulation of deformation curve.

10. The method as claimed in claim 1, characterized in that said sampling time interval is chosen in such a way as to be long enough to cover several acquisitions of positioning and traction measurements by said measurement means.

11. The method as claimed in claim 10, characterized in that the duration of said sampling time interval is of the order of a few minutes.

12. The method as claimed in claim 1, characterized in that for each streamer furnished with traction measurement means, a traction measurement is performed at the head of the streamer.

13. The method as claimed in claim 1, characterized in that the simulated streamer positioning and traction data are obtained via an unsteady hydrodynamic coupling algorithm.

14. The method as claimed in claim 13, characterized in that said algorithm models each streamer by several pieces when the ship is moving along a substantially rectilinear trajectory, and by a greater number of segments when the ship is turning.

15. The method as claimed in claim 14, characterized in that said greater number of segments is of the order of fifteen.

16. A device for the implementation of the method as claimed in claim 1, comprising streamer traction acquisition means (50), streamer positioning acquisition means (51), and processing means (52) for allowing the implementation of an algorithm to determine at each sampling time interval a current vector representative of the real current.

\* \* \* \* \*